US011388585B2

(12) United States Patent
Kim et al.

(10) Patent No.: US 11,388,585 B2
(45) Date of Patent: Jul. 12, 2022

(54) TEMPORARY HANDLING OF WIRELESS COMMUNICATION DEVICE CAPABILITIES

(71) Applicant: Apple Inc., Cupertino, CA (US)

(72) Inventors: Yuchul Kim, San Jose, CA (US); Christian W. Mucke, Cupertino, CA (US); Haijing Hu, Beijing (CN); Dawei Zhang, Saratoga, CA (US); Matthias Sauer, Campbell, CA (US); Johnson O. Sebeni, Fremont, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/240,772

(22) Filed: Apr. 26, 2021

(65) Prior Publication Data

US 2021/0250754 A1 Aug. 12, 2021

Related U.S. Application Data

(63) Continuation of application No. 16/763,897, filed as application No. PCT/CN2017/111533 on Nov. 17, 2017, now Pat. No. 10,993,104.

(51) Int. Cl.
*H04W 8/22* (2009.01)
*H04W 8/00* (2009.01)
(Continued)

(52) U.S. Cl.
CPC .............. *H04W 8/22* (2013.01); *H04W 8/005* (2013.01); *H04W 88/06* (2013.01); *H04W 88/08* (2013.01)

(58) Field of Classification Search
CPC .................................. H04W 8/22; H04W 8/005
See application file for complete search history.

(56) References Cited

U.S. PATENT DOCUMENTS

2013/0303235 A1  11/2013  Zheng et al.
2015/0304957 A1  10/2015  Noh et al.
(Continued)

FOREIGN PATENT DOCUMENTS

CN  101426292 A  5/2009
CN  101431773 A  5/2009
(Continued)

OTHER PUBLICATIONS

International Search Report for PCT/CN2017/111533, dated Nov. 17, 2017, 3 pages.
(Continued)

*Primary Examiner* — Curtis B Odom
(74) *Attorney, Agent, or Firm* — Kowert, Hood, Munyon, Rankin & Goetzel, P.C.

(57) ABSTRACT

A wireless communication device (UE) may provide information pertaining to one or more operating capabilities of the UE to LTE and 5G-NR networks. The UE may transmit information to an LTE base station directly, and to a 5G-NR base station directly, or indirectly via the LTE base station. The information may include preferred values corresponding to any number of different operating parameters associated with wireless communications or wireless communication capabilities of the UE in both LTE and 5G-NR networks, to inform and/or request the LTE and 5G-NR networks to make provisions based on the transmitted information for the wireless communications of the UE on those networks. The UE may thereby provide assistance information to LTE and 5G-NR networks in a multi-radio-access-technology dual-connectivity setting to request the respective networks to adjust certain operating capabilities of the UE in order to alleviate one or more operating issues that may be affecting the UE.

20 Claims, 7 Drawing Sheets

(51) Int. Cl.
*H04W 88/06* (2009.01)
*H04W 88/08* (2009.01)

(56) References Cited

U.S. PATENT DOCUMENTS

| | | | | |
|---|---|---|---|---|
| 2016/0021554 | A1* | 1/2016 | Behravan | H04B 15/00 455/63.1 |
| 2017/0041975 | A1 | 2/2017 | Skarby et al. | |

FOREIGN PATENT DOCUMENTS

| | | |
|---|---|---|
| CN | 102123466 A | 7/2011 |
| CN | 104812088 A | 7/2015 |
| CN | 104969615 A | 10/2015 |
| CN | 105122918 A | 12/2015 |
| CN | 105517043 A | 4/2016 |
| CN | 105594275 A | 5/2016 |
| CN | 106160963 A | 11/2016 |
| JP | 2017204741 A | 11/2017 |
| WO | 2014108847 A1 | 7/2014 |
| WO | 2015108388 A1 | 7/2015 |
| WO | 2016025548 A1 | 2/2016 |

OTHER PUBLICATIONS

Notice of Allowance for Chinese Patent Application No. 201780096872.4; 7 pages; dated Apr. 6, 2022.

3rd Generation Partnership Prooject; Techinical Spdivication Group Radio Access Technology; Study on New Radio Access Technology; Radio Interface Protocol Aspects; 3GPP TR 38.804 vo..6.10; 60 pages; Feb. 20017.

Liu et al. "Discussion on LTE-NR Dual Connection Technique", Mobile Communications; 7 pages; Oct. 5, 2017.

ZTE et al. "Report of Email discussion 96-33 UE capability coordination"; 3GPP TSG RAN NR Adhoc R2-1700407; Spokane, UA; 33 pages; Jan. 17-19, 2017.

Nokia et al. "UE capability structure and coordination aspects for MR-DC"; 3GPP TSG-RAN WG2 NR Adhoc #2 R2-1706859; Qingdao, China; 14 pages; Jun. 27-29, 2017.

* cited by examiner

TEMPORARY HANDLING OF WIRELESS COMMUNICATION DEVICE CAPABILITIES

PRIORITY CLAIM

This application is a continuation of U.S. patent application Ser. No. 16/763,897, titled "Temporary Handling of Wireless Communication Device Capabilities", filed on May 13, 2020, which is a national stage application of International Application No. PCT/CN2017/111533, titled "Temporary Handling of Wireless Communication Device Capabilities", filed on Nov. 17, 2017, both of which are hereby incorporated by reference as though fully and completely set forth herein.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD OF THE INVENTION

The present application relates to wireless communications and communication devices, and more particularly to temporarily adjusting wireless communication device capabilities during 3GPP and 5G New Radio (5G-NR) communications.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities.

Long Term Evolution (LTE) has become the technology of choice for the majority of wireless network operators worldwide, providing mobile broadband data and high-speed Internet access to their subscriber base. LTE defines a number of downlink (DL) physical channels, categorized as transport or control channels, to carry information blocks received from the MAC and higher layers. LTE also defines three physical layer channels for the uplink (UL).

The Physical Downlink Shared Channel (PDSCH) is a DL transport channel, and is the main data-bearing channel allocated to users on a dynamic and opportunistic basis. The PDSCH carries data in Transport Blocks (TB) corresponding to a media access control protocol data unit (MAC PDU), passed from the MAC layer to the physical (PHY) layer once per Transmission Time Interval (TTI). The PDSCH is also used to transmit broadcast information such as System Information Blocks (SIB) and paging messages.

The Physical Downlink Control Channel (PDCCH) is a DL control channel that carries the resource assignment for UEs that are contained in a Downlink Control Information (DCI) message. Multiple PDCCHs can be transmitted in the same subframe using Control Channel Elements (CCE), each of which is a nine set of four resource elements known as Resource Element Groups (REG). The PDCCH employs quadrature phase-shift keying (QPSK) modulation, with four QPSK symbols mapped to each REG. Furthermore, 1, 2, 4, or 8 CCEs can be used for a UE, depending on channel conditions, to ensure sufficient robustness.

The Physical Uplink Shared Channel (PUSCH) is a UL channel shared by all devices (user equipment, UE) in a radio cell to transmit user data to the network. The scheduling for all UEs is under control of the LTE base station (enhanced Node B, or eNB). The eNB uses the uplink scheduling grant (DCI format 0) to inform the UE about resource block (RB) assignment, and the modulation and coding scheme to be used. PUSCH typically supports QPSK and quadrature amplitude modulation (QAM). In addition to user data, the PUSCH also carries any control information necessary to decode the information, such as transport format indicators and multiple-in multiple-out (MIMO) parameters. Control data is multiplexed with information data prior to digital Fourier transform (DFT) spreading.

The Physical Control Format Indicator Channel (PCFICH) is a DL control channel that carries the Control format Indicator (CFI) which includes the number of orthogonal frequency-division multiplexing (OFDM) symbols used for control channel transmission in each subframe (typically 1, 2, or 3). The 32-bit long CFI is mapped to 16 Resource Elements in the first OFDM symbol of each downlink frame using QPSK modulation.

Therefore, as indicated above, during data communication over LTE, the DL uses the physical channel PDSCH, while in UL it uses the UL channel PUSCH. As also mentioned above, these two channels convey the transport blocks of data in addition to some MAC control and system information. To support the transmission of DL and UL transport channels, Downlink Shared Channel (DLSCH) and Uplink Shared Channel (ULSCH) control signaling is required. This control information is sent in PDCCH and it contains DL resource assignment and UL grant information. PDCCH is sent in the beginning of every subframe in the first OFDM symbols. Depending on the level of robustness and the PDCCH system capacity (numbers of users to be simultaneously served in a TTI) the NW needs to achieve, PDCCH will be transmitted in either the first 1, 2, 3, or 4 OFDM symbols of a subframe. The number of OFDM symbols used in PDCCH is signaled in PCFICH. In order to improve operation of range constrained devices and/or devices operating in weak coverage areas, blind decoding of the PDCCH was developed as a possible mechanism for alleviating the negative effects of bad reception of the PCFICH.

A proposed next telecommunications standard moving beyond the current International Mobile Telecommunications-Advanced (IMT-Advanced) Standards is called 5th generation mobile networks or 5th generation wireless systems, or 5G for short (otherwise known as 5G-NR for 5G New Radio). 5G-NR proposes a higher capacity for a higher density of mobile broadband users, also supporting device-to-device, ultra-reliable, and massive machine communications, as well as lower latency and lower battery consumption, than current LTE standards. As 5G-NR networks are established, various intermediate stages of development include provisions for multi-radio-access-technology (multi-RAT) modes of operation for wireless communication devices (or UEs), whereby UEs may connect to both LTE and 5G-NR networks. At times, operating UEs may need to communicate information pertaining to certain operating capabilities of the UE to the network. For example, the UE may need to inform the network that the UE is overheating. While certain provisions have been made for some limited communications of such information by UEs to LTE networks, there are presently no standard mechanisms in place for such communications in 5G-NR networks.

Other corresponding issues related to the prior art will become apparent to one skilled in the art after comparing such prior art with the disclosed embodiments as described herein.

SUMMARY OF THE INVENTION

Embodiments described herein relate to a User Equipment (UE) device, base station, and/or relay station, and associated method for a UE providing information pertaining to one or more operating capabilities of the UE to LTE and 5G-NR networks. In some embodiments, the UE may transmit information (referred to as UE Assistance Information) regarding any number of different operating parameters associated with wireless communications of the UE in LTE and 5G-NR networks, to inform and/or request the LTE and 5G-NR networks to make provisions for the wireless communications of the UE based on the transmitted information.

At least three different approaches may be used for transmitting the UE Assistance Information in a multi-radio-access-technology (Multi-RAT) dual connectivity system, in which a UE communicates with an LTE base station (eNB operating as a master node, MN), and also communicates with an NR base station (gNB operating as a secondary node, SN), with the MN coupling to an EPC (evolved packet core) network and also communicating with the SN.

In a first approach, LTE UE Assistance Information may be extended to NR networks, and NR related capability information may be added to or included in LTE UE Assistance Information transmissions, and the eNB may forward the information to the gNB.

In a second approach, NR messages (e.g. NR RRC messages) may be defined and used for reporting the UE Assistance Information corresponding to UE operating capabilities associated with communication on the NR network. The UE may transmit an LTE message (e.g. LTE RRC message) to the eNB, with the LTE message encapsulating the NR message (e.g. the NR RRC message) which includes the UE Assistance Information and/or temporary capability adjustment/restriction request for NR communications. The eNB may forward the LTE message that includes the encapsulated NR message to the gNB. The UE may also send an LTE message that includes UE Assistance Information for LTE to the eNB, and the eNB and gNB may independently handle the respective messages received, and may adjust (e.g. reduce) the UE capabilities as applicable.

In a third approach, the UE may transmit separate requests and/or UE Assistance Information for LTE and NR to the eNB and the gNB, respectively. For example, the UE may transmit an LTE message (e.g. LTE RRC message) to the eNB, with the message including LTE UE Assistance Information or a temporary capability adjustment/restriction request for LTE. Similarly, the UE may transmit an NR message (e.g. an NR RRC message) separately of the LTE message to the gNB, with the message including NR UE Assistance Information and/or a temporary capability adjustment/restriction request for NR. The eNB and gNB may independently handle the respective messages received, this time directly from the UE, and may adjust (e.g. reduce) the UE capabilities as applicable.

Accordingly, in some embodiments, a UE may wirelessly communicate with a first base station according to a first radio access technology (RAT) and with a second base station according to a second RAT. In some embodiments the first RAT is LTE and the second RAT is 5G-NR (or NR for short). The UE may transmit assistance information to the first base station, with the assistance information including first preferred values corresponding to one or more first operating capabilities of the UE associated with communicating according to the first RAT, and further including second preferred values corresponding to one or more second operating capabilities of the UE associated with communicating according to the second RAT. The second preferred values may be be forwarded by the first base station to the second base station. The UE may conduct transmissions with the first base station according to adjusted or unadjusted first operating capabilities depending on whether the first base station adjusted the first operating capabilities according to the first preferred values. The UE may similarly conduct transmissions with the second base station according to adjusted or unadjusted second operating capabilities depending on whether the second base station adjusted the second operating capabilities according to the second preferred values.

The UE may transmit the assistance information in a first-RAT radio resource control (RRC) message, e.g. in an LTE RRC message. Furthermore, the UE may transmit the assistance information in response to an operating issue of the UE, which may include the UE overheating, consuming more than a specified amount of power, experiencing in-device coexistence performance issues, and or hardware sharing issues. The UE may include the second preferred values in a second-RAT (e.g. NR) radio resource control message encapsulated in a first-RAT (e.g. LTE) radio resource control message, and the the first-RAT radio resource control message may then be forwarded by the first base station to the second base station. The UE may further transmit a message to the first base station, with the message indicating that at least one of the first operating capabilities or the second operating capabilities no longer need to be adjusted. In some embodiments the UE may conduct transmissions with the first base station according to the unadjusted first operating capabilities upon expiration of a first timer in the first base station, if the first base station adjusted the first operating capabilities, and may also conduct transmissions with the second base station according to the unadjusted second operating capabilities upon expiration of a second timer in the second base station, if the second base station adjusted the second operating capabilities.

In some embodiments, a UE may communicate wirelessly with a first base station according to a first RAT, e.g. LTE, and may also communicate with a second base station according to a second RAT (e.g. 5G-NR). The UE may transmit first assistance information to the first base station, where the first assistance information includes first preferred values corresponding to one or more first operating capabilities of the UE associated with communicating according to the first RAT. The UE may transmit second assistance information to the second base station, where the second assistance information includes second preferred values corresponding to one or more second operating capabilities of the UE associated with communicating according to the second RAT. The UE may then conduct transmissions with the first base station according to adjusted or unadjusted first operating capabilities depending on whether the first base station adjusted the first operating capabilities according to the first preferred values. Similarly, the UE may conduct transmissions with the second base station according to adjusted or unadjusted second operating capabilities depending on whether the second base station adjusted the second operating capabilities according to the second preferred values. The UE may transmit the first assistance information to the first base station in a first-RAT RRC message (e.g. an LTE RRC message), and may transmit the second assistance information to the second base station in a second-RAT RRC message (e.g. an NR RRC message).

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Figure 1:
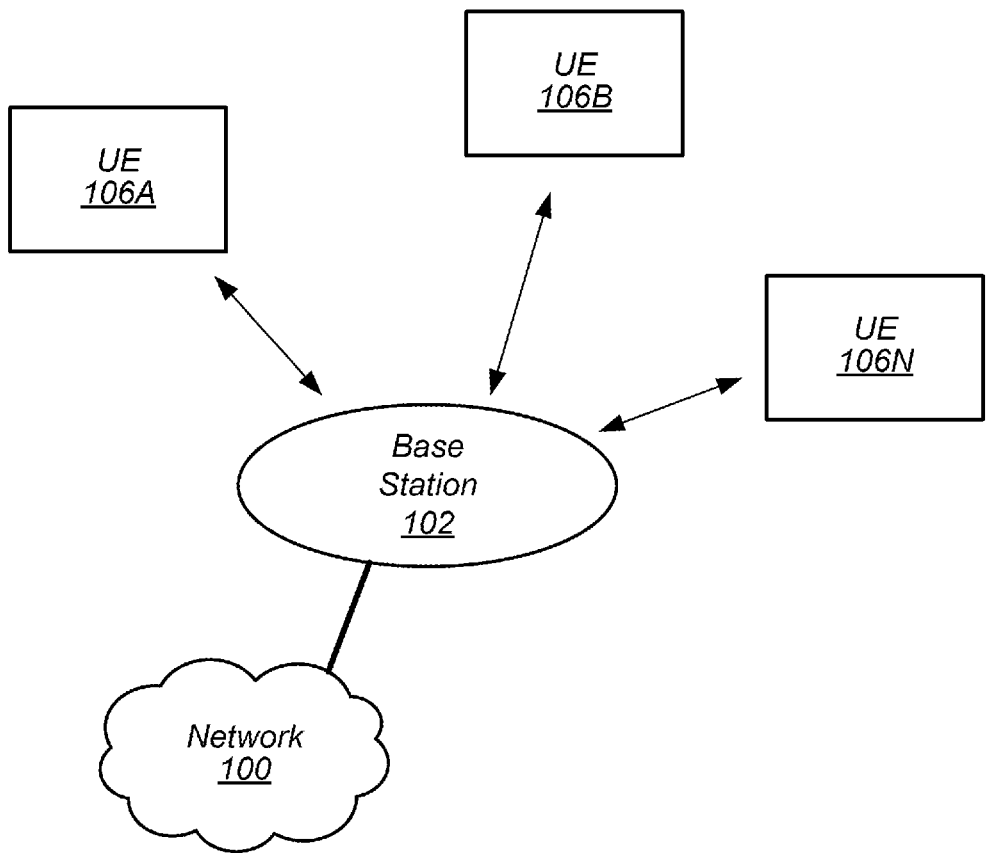
FIG. 1 illustrates an exemplary (and simplified) wireless communication system according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Acronyms

Various acronyms are used throughout the present application. Definitions of the most prominently used acronyms that may appear throughout the present application are provided below:
ACK: Acknowledge
BS: Base Station
CCE: Control Channel Elements
CFI: Control format Indicator
CQI: Channel Quality Indicator
CRC: Cyclic Redundancy Check
DCI: Downlink Control Information
DL: Downlink (from BS to UE)
DLSCH: Downlink Shared Channel
FDD: Frequency Division Duplexing
FEC: Forward Error Correction
GPS: Global Positioning System
GSM: Global System for Mobile Communication
LTE: Long Term Evolution
MIMO: Multiple-In Multiple-Out
NACK: Negative Acknowledge
NW: Network
OFDM: Orthogonal Frequency-Division Multiplexing
PCFICH: Physical Control Format Indicator Channel
PDCCH: Physical Downlink Control Channel
PDSCH: Physical Downlink Shared Channel
PDU: Protocol Data Unit
PHICH: Physical HARQ Indicator Channel
PUSCH: Physical Uplink Shared Channel
PHY: Physical (Layer)
REG: Resource Element Group
RRC: Radio Resource Control
RSRP: Reference Signal Received Power
RSSI: Reference Signal Strength Indicator
RX: Reception
SINR: Signal-To-Interference-Plus-Noise Ratio
TB: Transport Blocks
TBS: Transport Block Size
TDD: Time Division Duplexing
TTI: Transmission Time Interval
TX: Transmission
UE: User Equipment
UEAI: UE Assistance Information
UL: Uplink (from UE to BS)
ULSCH: Uplink Shared Channel
UMTS: Universal Mobile Telecommunication System

Terms

The following is a glossary of terms that may appear in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-transitory memory such as a Flash, magnetic media, e.g., a hard drive, or optical storage; registers, or other similar types of memory elements, etc. The memory medium may comprise other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Also referred to as wireless communication devices. Examples of UE devices include mobile telephones or smart phones (e.g., iPhone™, Android™-based phones) and tablet computers such as iPad™ Samsung Galaxy™, etc., portable gaming devices (e.g., Nintendo DS™, PlayStation Portable™, Gameboy Advance™, iPod™), laptops, wearable devices (e.g. Apple Watch™, Google Glass™) PDAs, portable Internet devices, music players, data storage devices, or other handheld devices, etc. Various other types of devices would fall into this category if they include Wi-Fi or both cellular and Wi-Fi communication capabilities and/or other wireless communication capabilities, for example over short-range radio access technologies (SRATs) such as BLUETOOTH™, etc. In general, the term "UE" or "UE device" may be broadly defined to encompass any electronic, computing, and/or telecommunications device (or combination of devices) which is easily transported by a user and capable of wireless communication.

Base Station (BS)—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, e.g. in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wireless Device (or wireless communication device)—any of various types of computer systems devices which performs wireless communications using WLAN communications, SRAT communications, Wi-Fi communications and the like. As used herein, the term "wireless device" may refer to a UE device, as defined above, or to a stationary device, such as a stationary wireless client or a wireless base station. For example a wireless device may be any type of wireless station of an 802.11 system, such as an access point (AP) or a client station (UE), or any type of wireless station of a cellular communication system communicating according to a cellular radio access technology (e.g. LTE, CDMA, GSM), such as a base station or a cellular telephone, for example.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits. Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
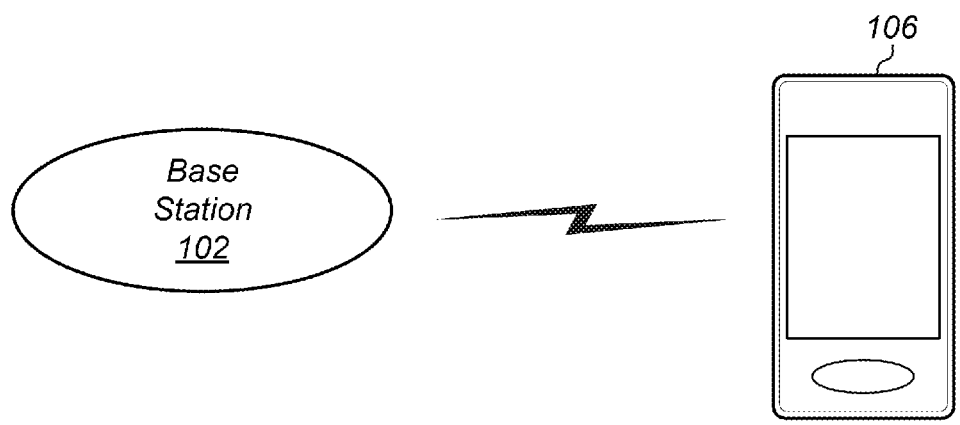
FIG. 2 illustrates a base station in communication with a wireless user equipment (UE) device according to some embodiments.

FIGS. 1 and 2—Communication System

FIG. 1 illustrates an exemplary (and simplified) wireless communication system. It is noted that the system of FIG. 1 is merely one example of a possible system, and embodiments may be implemented in any of various systems, as desired. As shown, the exemplary wireless communication system includes a base station 102 which communicates over a transmission medium with one or more user devices 106A through 106N. Each of the user devices may be referred to herein as a "user equipment" (UE) or UE device. Thus, the user devices 106A-106N are referred to as UEs or UE devices. Furthermore, when referring to an individual UE in general, user devices are also referenced herein as UE 106 or simply UE.

The base station 102 may be a base transceiver station (BTS) or cell site, and may include hardware that enables wireless communication with the UEs 106A through 106N. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the user devices and/or between the user devices and the network 100. The base station 102 may also communicate with other base stations, as will be further described below. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network. It should also be noted that "cell" may also refer to a logical identity for a given coverage area at a given frequency. In general, any independent cellular wireless coverage area may be referred to as a "cell". In such cases a base station may be situated at particular confluences of three cells. The base station, in this uniform topology, may serve three 120-degree beam-width areas referenced as cells. Also, in case of carrier aggregation, small cells, relays, etc. may each represent a cell. Thus, in carrier aggregation in particular, there may be primary cells and secondary cells which may service at least partially overlapping coverage areas but on different respective frequencies. For example, a base station may serve any number of cells, and cells served by a base station may or may not be collocated (e.g. remote radio heads).

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), % G-NR (or NR, for short), 3GPP2 CDMA2000 (e.g., 1×RTT, 1×EV-DO, HRPD, eHRPD), Wi-Fi, WiMAX etc. In some embodiments, the base station 102 communicates with at least one UE using control indicators for (or associated with) physical control channels as disclosed herein.

UE 106 may be capable of communicating using multiple wireless communication standards, or radio access technologies (RATs). For example, a UE 106 might be configured to communicate using either or all of a 3GPP cellular communication standard (such as LTE) or a 3GPP2 cellular communication standard (such as a cellular communication standard in the CDMA2000 family of cellular communication standards) or a 5G-NR (new radio standard). In some embodiments, the UE 106 may be configured to communicate with base station 102 using control indicators for (or corresponding to/associated with) physical control channels as described herein. Base station 102 and other similar base stations operating according to the same or a different cellular communication standard may thus be provided as one or more networks of cells, which may provide continuous or nearly continuous overlapping service to UE 106 and similar devices over a wide geographic area via one or more cellular communication standards.

The UE 106 might also or alternatively be configured to communicate using WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates an exemplary system in which user equipment 106 (e.g., one of the devices 106A through 106N) is in communication with the base station 102. The UE 106 may be a device with wireless network connectivity such as a mobile phone, a hand-held device, a wearable device, a computer or a tablet, or virtually any type of wireless device. The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments of providing control indicators for (or corresponding to/associated with) physical control channels as described herein, or any portion of any of the method embodiments of providing control indicators for (or corresponding to/associated with) physical control channels described herein. The UE 106 may be configured to communicate using any of multiple wireless communication protocols. For example, the UE 106 may be configured to communicate using two or more of CDMA2000, LTE, LTE-A, 5G-NR (or NR for short), WLAN, or GNSS. Other combinations of wireless communication standards are also possible.

The UE 106 may include one or more antennas for communicating using one or more wireless communication protocols. In some embodiments, the UE 106 may share one or more parts of a receive chain and/or transmit chain between multiple wireless communication standards. The shared radio may include a single antenna, or may include multiple antennas (e.g., for MIMO) for performing wireless communications. Alternatively, the UE 106 may include separate transmit and/or receive chains (e.g., including separate antennas and other radio components) for each wireless communication protocol with which it is configured to communicate. As another alternative, the UE 106 may include one or more radios which are shared between multiple wireless communication protocols, and one or more radios which are used exclusively by a single wireless communication protocol. For example, the UE 106 may include radio circuitries for communicating using either LTE or CDMA2000 1×RTT or 5G-NR, and/or communicating using each of Wi-Fi and BLUETOOTH™. Other configurations are also possible.

Figure 3:
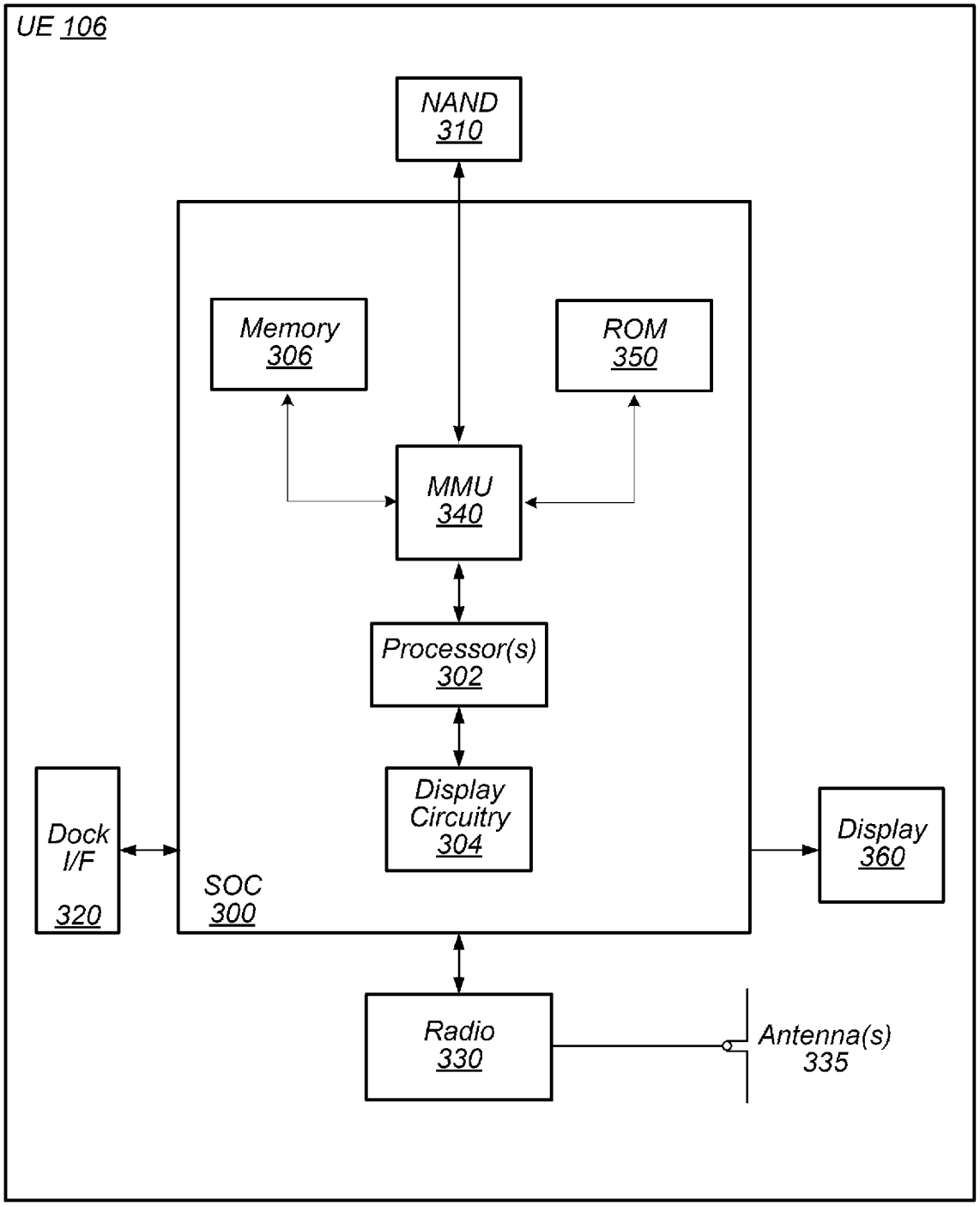
FIG. 3 illustrates an exemplary block diagram of a UE, according to some embodiments.

FIG. 3—Exemplary Block Diagram of a UE

FIG. 3 illustrates an exemplary block diagram of a UE 106. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to the computer system), the display 360, and wireless communication circuitry 330 (e.g., for LTE, LTE-A, 5G-NR, CDMA2000, BLUETOOTH™, Wi-Fi, GPS, etc.). The UE device 106 may include at least one antenna 335, and possibly multiple antennas 335, for performing wireless communication with base stations and/or other devices. For example, the UE device 106 may use antenna(s) 335 to perform the wireless communication. As noted above, the UE may be configured to communicate wirelessly using multiple wireless communication standards in some embodiments.

As described further subsequently herein, the UE 106 and base station 102 may both include hardware and software components for implementing a method for the UE providing information pertaining to one or more operating capabilities of the UE to LTE and 5G-NR networks. In some embodiments, the UE may transmit information regarding any number of different operating parameters associated with wireless communications of the UE in LTE and NR (5G-NR) networks, to inform and/or request the LTE and/or 5G-NR network(s) to make provisions for the wireless communications of the UE based on the transmitted information, e.g. by adjusting various operating parameters associated with wireless communications of the UE (also referred to herein as adjusting the "capabilities of the UE".) For example, the processor 302 of the UE device 106 may be configured to implement part or all of the methods of the UE transmitting information regarding any number of different operating parameters associated with wireless communications of the UE in LTE and 5G-NR networks, to inform and/or request the LTE and 5G-NR networks to adjust the capabilities of the UE based at least on the transmitted information. In other embodiments, processor 302 may be configured as a programmable hardware element, such as an FPGA (Field Programmable Gate Array), or as an ASIC (Application Specific Integrated Circuit). Furthermore, processor 302 may be coupled to and/or may interoperate with other components, such as Radio 330, as shown in FIG. 3, to implement provisioning control indicators for (or corresponding to/associated with) physical control channels, according to various embodiments disclosed herein.

Figure 4:
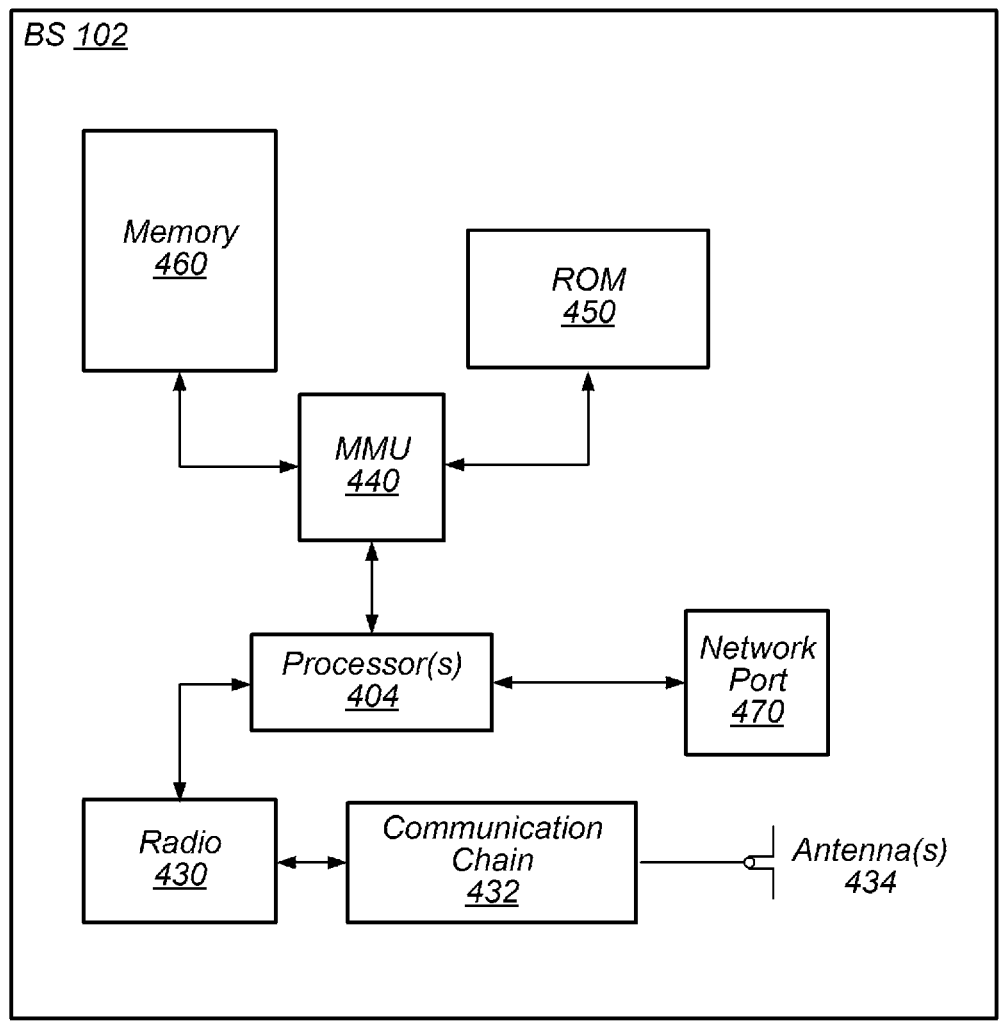
FIG. 4 illustrates an exemplary block diagram of a base station according to some embodiments.

FIG. 4—Exemplary Block Diagram of a Base Station

FIG. 4 illustrates an exemplary block diagram of a base station 102. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider). The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas 434. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be configured to communicate via various wireless telecommunication standards, including, but not limited to, LTE, LTE-A, NR (5G-NR), WCDMA, CDMA2000, etc. The processor(s) 404 of the base station 102 may be configured to implement part or all of the methods described herein for receiving information from UEs regarding any number of different operating parameters associated with wireless communications of the UE in LTE and 5G-NR networks, to adjust the capabilities of the UE based at least on the received information, e.g., by executing program instructions stored on a memory medium (e.g., a non-transitory computer-readable memory medium). Alternatively, the processor(s) 404 may be configured as a programmable hardware element(s), such as an FPGA (Field Programmable Gate Array), or as an ASIC (Application Specific Integrated Circuit), or a combination thereof. Overall, the various components (460, 450, 440, 404, 430, 432, 470 and 434) of BS 102 may interoperate to implement at least part or all of the methods described herein for receiving information and/or request from a UE regarding any number of different operating parameters associated with wireless communications of the UE in LTE and 5G-NR networks, to adjust, e.g. reduce, the capabilities of the UE based at least on the received information/request(s).

Multi-Radio-Access-Technology (Multi-RAT) Dual Connectivity

As previously mentioned, the next generation wireless standard, referred to as 5G-NR or NR for short, proposes a higher capacity for a higher density of mobile broadband communications, and as NR networks are established, various intermediate stages of development have been proposed to make provisions for multi-radio-access-technology (multi-RAT) modes of operation for wireless communication devices (or UEs), whereby UEs may connect to both LTE and NR networks. LTE networks operate according to an Evolved Packet Core (EPC) framework which provides converged voice and data on an LTE network. While 2G and 3G network architectures process and switch voice and data through two separate sub-domains, circuit-switched (CS) for voice and packet-switched (PS) for data, EPC unifies voice and data on an Internet Protocol (IP) service architecture, in which voice is treated as just another IP application.

Accordingly, two main modes of operation have been identified for UEs to accommodate the establishment of NR networks while also operating on LTE networks. A "Standalone", or SA mode of operation represents a standalone NR option, which does not require an already deployed LTE network core. SA (or SA NR) operation implies full user and control plane capability for NR, utilizing the new NR core network architecture also being developed in 3GPP. A "Non-Standalone", or NSA mode of operation represents use of an anchored 3GPP LTE deployment, with the NR carriers used to boost throughput speeds and cut network latency. NSA mode of operation is intended to accelerate the NR schedule by introducing an intermediate stage for an early completion of a variant of NR, which is referred to as NSA (or NSA NR) mode of operation, which enables 3GPP-based large-scale trials and deployments. NSA mode of operation utilizes the existing LTE radio and core network as an anchor for mobility management and coverage while adding a new NR (5G-NR) carrier.

Figure 5:
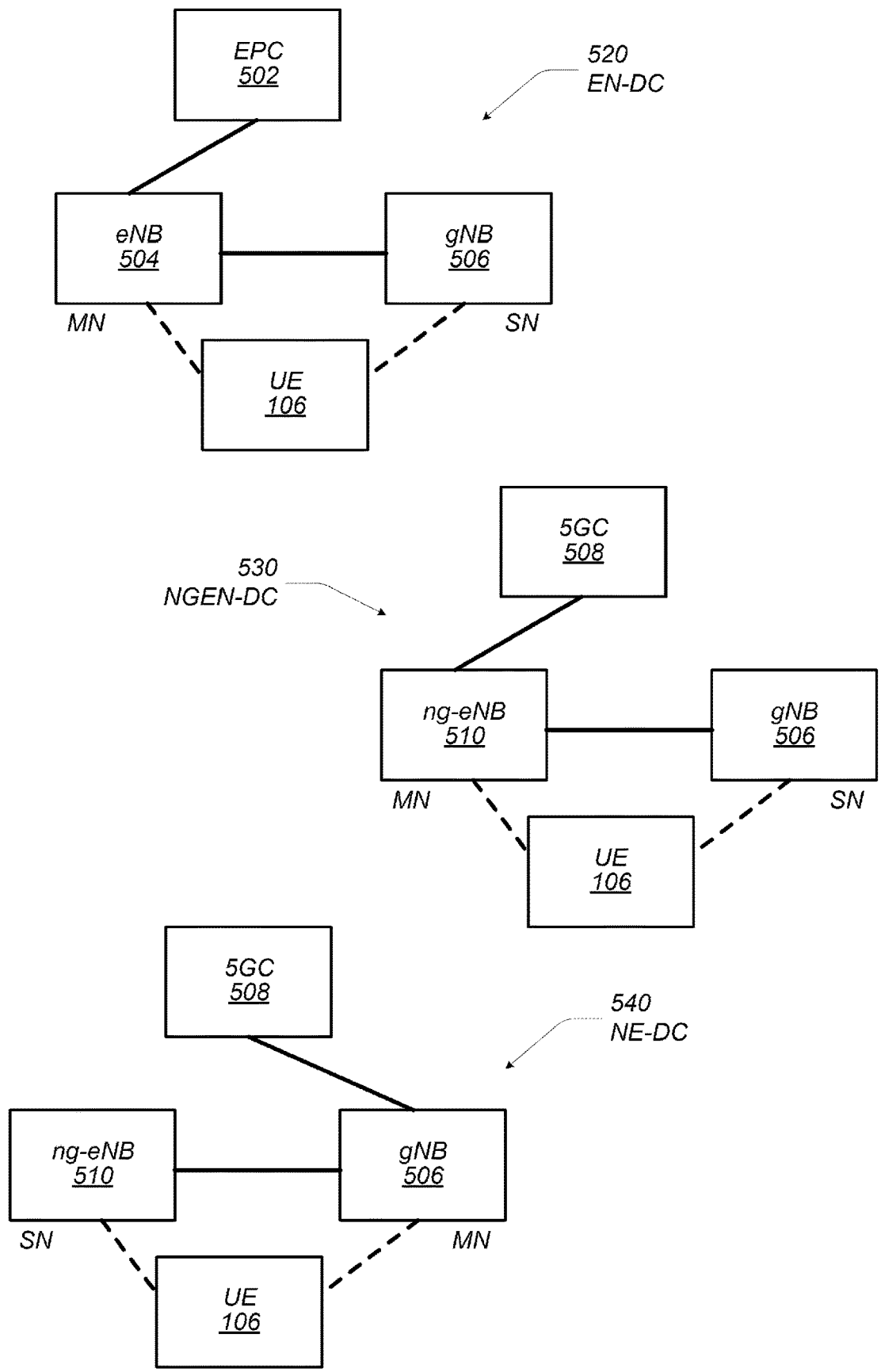
FIG. 5 shows exemplary block diagrams illustrating various multi-RAT dual-connectivity wireless communication systems, according to some embodiments.

Pursuant to the above, Multi-RAT Dual Connectivity (MR-DC) was defined for UEs connecting to both LTE and NR networks. Thus, MR-DC allows a UE to connect to both eNB (LTE base station) and gNB (NR base station) simultaneously. Depending on the core network, master node (MN), and secondary node (SN), three main connectivity modes may be defined: EN-DC, NGEN-DC, and NE-DC, as illustrated in FIG. 5. An exemplary EN-DC system 520 shown in FIG. 5 includes an eNB 504 connecting to an EPC network 502 as an MN. The MN eNB 504 may also communicate with gNB 506, which may serve as an SN. Finally, UE 106 may individually and independently communicate with eNB 504 as well as gNB 506. In the first phase of 5G (or NR), a network is designed to operate in the EN-DC mode 520 as shown in FIG. 5, where gNB 506 (operating as an SN) communicates with EPC network 502 through eNB 504 (operating as the MN). In EN-DC, control and data are transmitted/received over eNB and gNB respectively. In an NSA mode of operation, the MR-DC operation takes place with only the MN (in this case eNB 504) being connected to the core network (in this case EPC 502). FIG. 5 also illustrates an NGEN-DC (next generation) 530 system, in which a next generation eNB 510 (operating as an MN) is connected to a 5G core (5GC) network, and gNB 506 (operating as an SN) communicates with ng-eNB 510, with UE 106 individually and independently communicating with ng-eNB 510 and gNB 506. Finally, FIG. 5 illustrates an NE-DC system 540, in which a gNB 506 operates as the MN connecting to 5GC network 508, with ng-eNB 510 operating as an SN communicating with gNB 506. Again, UE 106 individually and independently communicates with ng-eNB 510 and gNB 506.

UE Operating Capabilities and Operating Parameters

As previously mentioned, at times, UEs may need to communicate information pertaining to certain operating capabilities of the UE to the network. For example, the UE may need to inform the network that the UE is overheating. Consequently, it may be useful for the UE to communicate information pertaining to certain operating parameters of the UE to the network. LTE UE supports high data rates with multiple MIMO (multiple-input-multiple-output) layers, high order modulations, and carrier aggregation (CA). As a result, an LTE UE may often experience an overheating problem when supporting high rates with the above mentioned features enabled. Therefore, an agreement was reached to make provisions for an LTE UE to inform the network about internal overheating by transmitting certain information to the network as dedicated "UE Assistance Information". This information may include information pertaining to the category of the UE (adjusted/reduced UE category for UL/DL), and information pertaining to the number of component carriers (CCs; adjusted/reduced number of CCs for UL/DL).

An agreement was reached to implement a temporary capability adjustment/restriction mechanism in NR SA operations, to temporarily limit a UE's capability in order to address and handle issues such as a UE overheating, hardware sharing, interference, etc. A UE may transmit a temporary capability restriction request to network, and the network may either confirm or reject such a request. However, no details of any temporary capability restriction mechanism(s) for NR SA have been identified yet. In other words, no agreed-upon mechanism currently exists for handling NR UE overheating in NSA operation. In NSA mode of operation it is very likely that NR communications contribute more to UE overheating than LTE communications, considering that NR supports a very large bandwidth (up to 400 MHz per carrier), higher peak data rate(s) with higher modulation order (up to 256QAM), up to 8 MIMO layers, and many aggregated carriers (<=16). Therefore, it is desirable to introduce an overheating handling mechanism for NR in NSA mode. More generally, it is desirable to introduce a comprehensive mechanism for handling UE capability adjustments initiated by the UE with the LTE and NR networks, e.g. to reduce power consumption, reduce the workload on various hardware components of the UE, address interference issues, hardware sharing issues, and/or a variety of other operating characteristics, by enabling the UE to communicate information pertaining to various operating parameters of the UE to the LTE and/or NR networks, and have the networks adjust/reduce the capabilities of the UE based on that information.

UE Assistance Information Transmission Options

In some embodiments, at least three different transmission schemes or options may be devised for transmitting the UE Assistance Information (UEAI).

Option 1: The LTE UEAI is extended to NR networks, whereby NR related capability information may be added to/included in LTE UEAI transmissions. An eNB may forward the information to a gNB. For example, in the EN-DC system 520 shown in FIG. 5, UE 106 may transmit the LTE UEAI that includes the NR capability information to eNB 504, and eNB 504 may forward the NR capability information to gNB 506. Both eNB 504 and gNB 506 may adjust (e.g. reduce) the UE capabilities as applicable.

Option 2: Temporary capability adjustment/restriction is applicable to NSA mode of operation. NR messages (e.g. NR RRC messages) may be defined for reporting information corresponding to UE operating capabilities associated with NR communications. The reporting by the UE may be in response to certain operating issues with the UE, e.g. UE overheating. Thus, the UE may report/transmit information pertaining to various operating parameters of the UE that may affect the UE's operating capabilities. E.g., the UE may transmit a temporary capability adjustment/restriction request for NR or NR UEAI in addition to transmitting a temporary capability adjustment/restriction request for LTE or LTE UEAI. Referring again to the EN-DC system 520 of FIG. 5, the UE 106 may transmit an LTE message (e.g. LTE RRC message) to the eNB 504, with the LTE message encapsulating the NR message (e.g. NR RRC message) that includes the NR UEAI and/or temporary capability adjustment/restriction request for NR. The eNB 504 and gNB 506 may independently handle the respective messages received, and may adjust (e.g. reduce) the UE capabilities as applicable.

Option 3: The UE may transmit separate requests and/or UEAI for LTE and NR. For example, referring again to the EN-DC system 520 of FIG. 5, the UE 106 may transmit an LTE message (e.g. LTE RRC message) to the eNB 504, with the message including LTE UEAI and/or a temporary capability adjustment/restriction request for LTE. Similarly, the UE 106 may transmit an NR message (e.g. an NR RRC message) separately from the LTE message, with the message including NR UEAI and/or a temporary capability adjustment/restriction request for NR. The eNB 504 and gNB 506 may independently handle the respective messages received, this time directly from the UE, and may adjust (e.g. reduce) the UE capabilities as applicable.

Option 1

As mentioned above the LTE UEAI is extended to include NR related capabilities as well. Accordingly, information pertaining to a great number of UE operating parameters may be included in messages that contain UEAI. As previously mentioned, the operating parameters already included for LTE are the category of the UE (adjusted/reduced UE category for UL/DL), and information pertaining to the number of component carriers (CCs; adjusted/reduced number of CCs for UL/DL). Information about these parameters may be incorporated as fields within the LTE UEAI. For example, the LTE UEAI includes the fields:

Reduced UE-Category DL (adjust the UE category for DL)
Reduced UE-Category UL (adjust the UE category for UL)
Reduced CCs DL (adjust the number of CCs for DL)
Reduced CCs UL (adjust the number of CCs for DL)

Pursuant to the above, in some embodiments, the following fields may be included in the LTE UEAI for NR:

Reduced UE-Category DL NR (adjust the UE category for DL for NR)
Reduced UE-Category UL NR (adjust the UE category for UL for NR)
Reduced UE-Category DL NR for MR-DC (adjust the UE category for DL in MR-DC mode of operation for NR)
Reduced UE-Category UL NR for NR-DC (adjust the UE category for UL in MR-DC mode of operation for NR)
Reduced CCs DL NR (adjust the number of CCs for DL for NR)
Reduced CCs UL NR (adjust the number of CCs for DL for NR)

Assistance information related to physical layer modulation for NR may be included as fields. Reducing the complexity of modulation scheme(s) may limit the maximum data, which may reduce the operating load on the hardware and me thereby reduce power consumption. The following fields may therefore be included in the LTE UEAI for NR:

Reduced Modulation Scheme NR (adjust the modulation scheme for NR)—decreasing modulation schemes may limit the supported maximum data rate
Reduced MIMO layers NR (adjust the number of MIMO layers for NR)—reducing MIMO layers effectively reduces the supported maximum data rate
Reduced CA Band Combination NR (adjust the number of bands used in CA for NR)—it may include the preferred set of band combinations that UE may support
Reduced maximum TBS for DL-shared-channel/UL-shared-channel NR (adjust the TBS for NR)—limiting the TBS may limit peak throughput
Reduced maximum size of Layer-2 (L2) buffers NR (adjust the maximum size of the L2 buffer for NR)—limiting buffer size may decrease throughput Resource Element (REs) in NR are the smallest unit of the resource grid constructed of one subcarrier in frequency domain and one OFDM symbol in time domain. A Resource Element Group (REG) in NR consists of one resource block (12 resource elements in frequency domain) and one OFDM symbol in the time domain. An REG bundle in NR consists of multiple REGs. A Control Channel Element (CCE) in NR consists of up of 6 REGs. The number REG bundles within a CCE may vary. A Control Resource Set (CORESET) in NR consists of multiple resource blocks (e.g. multiples of 12 REs) in the frequency domain, and '1 or 2 or 3' OFDM symbols in the time domain. A CORESET therefore defines time frequency resources. CORESET monitoring essentially involves the UE monitoring PDCCH. Assistance information related to PDCCH for NR may also be included as fields in the LTE UEAI.

Minimum CORESET monitoring period NR (adjust the CORESET monitoring period for NR)—increasing the minimum CORESET monitoring periodicity may provide the UE with time to go to micro-sleep mode in-between two CORESETs with no PDCCH monitoring and consequently no PDSCH scheduling, which may reduce power consumption and heat generation
Minimum UE-specific search space monitoring period NR (adjust UE-specific search space monitoring period for NR)—increasing the minimum search space monitoring periodicity may provide the UE with time to enter micro-sleep mode in-between two search spaces with no PDCCH monitoring, which may reduce power consumption and heat generation.
Minimum Cell-specific search space monitoring period NR (adjust cell-specific search space monitoring period for NR)—increasing the minimum search space monitoring periodicity may provide the UE with time to enter micro-sleep mode in-between two search spaces with no PDCCH monitoring, which may reduce power consumption and heat generation.
Maximum number of continuous slots PDCCH monitored NR (adjust the maximum number of continuous time slots during which PDCCH is monitored for NR)—this may limit the maximum number of slots the UE may continuously monitor until the next CORESET monitoring occasion (similar to the On-Duration in C-DRX for LTE). It may limit the amount of power and heat produced during one cycle of CORESET monitoring.
Maximum number of continuous slots data (PDSCH/PUSCH) scheduled NR (adjust the maximum number of continuous time slots during which data is transmitted during DL/UL for NR)—this may limit the maximum number of slots for the UE that may be scheduled continuously. It may limit the amount of power and heat produced during one cycle of CORESET monitoring. Data transmission requires more processing power than PDCCH monitoring.
Maximum number of blind decoding per slot NR (adjust the maximum number of times blind decoding is performed during a time slot)—limiting the number of blind decodes may save UE power and potentially reduce heat generation Assistance information related to PDCCH-PDSCH-ACK timing for NR may also be included as fields in the LTE UEAI. Four K values are defined for NR: K0 corresponds to the time difference between transmission of PDCCH and PDSCH, K1 corresponds to the time difference between transmission of PDSCH and the corresponding ACK, K2 corresponds to the time difference between transmission of PDCCH and PUSCH, and K3 corresponds to the time difference between transmission of PUSCH and the corresponding ACK. The K values may be dynamically signaled to the UE or may be semi-statically configured. Selection of respective K values by the UE may reduce processing requirements and therefore reduce power consumption and overheating. Accordingly, the following assistance information related to PDCCH-PDSCH-ACK timing for NR may be included as fields in the LTE UEAI.

Preferred set of K0 values NR (adjust the K0 value for NR)
Case 1: For cross-slot scheduling (due to dynamic switching between narrowband and wideband), K0>0 value may be required. In cross-slot scheduling PDCCH and PDSCH are transmitted in different time slots. PDCCH is scheduled first, then PDSCH. PDCCH may be received over narrowband (NB) while PDSCH may be received over wideband (WB).

Case 2: If CORESET monitoring periodicity is 2, then, K0=0 may save UE power since UE enter micro-sleep mode every other time slot. When K=0, it follows that PDCCH and PDSCH are transmitted simultaneously (same time slot). When K=0, the UE may avoid power ramp-down/ramp-up time for transitioning from PDCCH monitoring to micro-sleep mode to PDSCH data transmission.

Preferred set of K1 values NR (adjust the K1 value for NR)—when CORESET monitoring periodicity is e.g., 5, if K1=0, the UE receives PDSCH and send the corresponding ACK in the same time slot, which may save one modem power ramp-down and ramp-up cycle between PDSCH reception and ACK transmission slots, which may potentially reduce UE power consumption and potentially preventing overheating.

Preferred set of K2 values NR (adjust the K2 value for NR)—if K2=0, the UE receives UL grant and transmit PUSCH at the same slot, which may save a cycle of modem power ramp-down and ramp-up between UL grant and PUSCH transmission, which may potentially reduce UE power consumption and potentially preventing overheating.

Preferred set of K3 values NR (adjust the K3 value for NR)—if K3=1, then, UE transmits PUSCH in a time slot and receives an ACK in a next time slot, which may save a cycle of modem power ramp-down and ramp-up between PUSCH transmit and ACK receive, which may potentially reduce UE power consumption and potentially preventing overheating.

Assistance information related to Bandwidth part (BWP) and RF parameter for NR may also be included as fields in the LTE UEAI. BWP is a subset of the UE's maximum RF channel bandwidth (BW). For example, for each UE, the maximum BW may be divided into four (4) BWPs. Accordingly, the following assistance information related to BWP and RF parameter for NR may be included in the LTE UEAI.

Max size of BWP DL/UL NR (adjust the size of BWPs for NR)—limiting the maximum size of BWP for DL/UL for NR may potentially reduce UE power consumption or prevent overheating by limiting sample rate and buffering requirements. In one sense, this represents dynamically adjusting the BWP based on the amount of data transmitted. When a BWP is large but only a small amount of data is transmitted, the UE may be wasting power.

Preferred set of BWPs DL/UL NR (use the indicated preferred BWPs for the UE for NR)—UE may indicate a preferred set of BWPs for DL. The preferred BWPs may either be specified by the UE or selected from BWPs configured by the network. E.g., the UE may indicate which of the available BWPs are preferred (for use) by the UE.

Max number of active BWP DL/UL NR (adjust the maximum number of BWPs for DL/UL for NR—more than one active DL/UL BWPs may be supported. In this case, limiting the number of BWPs may reduce UE power consumption and prevent overheating. E.g., when there is support for more than one (more than a single) active BWP, the UE may indicate the maximum number of active BWPs the UE would preferably use.

Preferred BWP change timer value NR (adjust the BWP change time value for the UE for NR)—upon expiration of the BWP timer, the UE is expected to change its active BWP to a default BWP. By controlling the timer value, UE may potentially influence UE power consumption and heating. E.g., reducing the BWP change timer value may result in a quicker change by the UE to (using) a default BWP, which may be a narrow BW (e.g., for monitoring control channel(s)), which may also reduce power consumption when moving from a higher BW BWP to a lower BW BWP.

Reduced Maximum UE channel bandwidth DL/UL NR (adjust the maximum UE channel bandwidth for NR)—similar to the 'Max size of BWP DL/UL NR' above, this may limit the maximum bandwidth supported by the UE, which may reduce power consumption and prevent overheating.

In LTE, carrier aggregation (CA) refers to the process of aggregating two or more component carriers (CCs) in order to support wider transmission bandwidths, e.g. bandwidths of up to 100 MHz. A UE may simultaneously receive or transmit on one or multiple CCs depending on the UE's capabilities. When CA is configured, the UE may maintain one RRC connection with the network. The serving cell managing the UE's RRC connection is referred to as the Primary Cell (Pcell), and Secondary Cells (Scells) together with the Pcell may form a set of serving cells. In CA, a UE may be scheduled via PDCCH over multiple serving cells simultaneously. Cross-carrier scheduling with the Carrier Indicator Field (CIF) allows the PDCCH of a serving cell to schedule resources on another serving cell. That is, a UE receiving a downlink assignment on one CC may receive associated data on another CC. The following assistance information related to CA for NR may be included in the LTE UEAI.

Reduced component carriers (CCs) DL/UL NR (adjust the number of DL/UL CCs for NR)—if the number of DL/UL CCs is reduced, UE processing load may be reduced and accordingly heating may also be reduced.

Preferred Scell inactivity timer value NR (adjust the Scell inactivity timer for NR)—if Scell is not used, it may be deactivated after the timer expires. Depending on traffic load and need, controlling this value may have an impact on UE power savings/heating. The timer change is similar to the BWP timer change in that the sooner the Scell connectivity is deactivated, the sooner the processing load is reduced, and the sooner power consumption may also be reduced.

Currently the UE is expected to report up to four (4) different DL beams. The following assistance information related to beam measurement and/or reporting for NR may be included in the LTE UEAI Preferred maximum number of DL beams to report NR (adjust the maximum number of beams to report for NR)—if the reporting requirement is reduced, it may potentially reduce UE power consumption and heat for measurement and UL transmission. In other words, reducing the number of beams to report may improve the processing load and power consumption.

Preferred minimum SRS transmission period NR (adjust the minimum SRS [Sounding Reference Signal] transmission period for NR)—increasing the minimum SRS transmit period may reduce UE power consumption and heat at the cost of reduced UL beam management performance. Increasing the SRS transmission period means fewer instances of SRS transmission, which reduces load/power consumption.

Preferred minimum CSI report period (adjust the minimum CSI [Channel State Information] reporting period for NR)—increasing the minimum CSI report period may reduce UE power consumption and heat at the cost of DL reduced beam management performance.

DRX related values/parameters as defined in LTE may also be included for NR in the LTE UEAI, as controlling DRX parameters may have an impact on UE power consumption and heating during both connected mode and idle mode.

Preferred On-Duration timer value NR (adjust the On-Duration time value for NR)

Preferred DRX Inactivity timer value NR (adjust the DRX inactivity timer value for NR)

Preferred short DRX cycle value NR (adjust the short DRX cycle value for NR)

Preferred DRX short Cycle-Timer value NR (adjust the DRX short Cycle-Timer value for NR)

Preferred long DRX Cycle Start Offset value NR (adjust the long DRX Cycle Start Offset value for NR)

Preferred HARQ RTT timer value NR (adjust the HARQ RTT timer value for NR)

Preferred DRX Retransmission Timer NR (adjust the DRX Retransmission Timer value for NR)

Preferred DRX cycle NR (adjust the DRX cycle value for NR)

NR supports two different types of UL. Regular UL and supplemental UL (SUL). Furthermore, NR also supports ACK bundling, where multiple ACKs corresponding to different respective DL transmissions may be merged into a single ACK. If implemented by the UE, ACK bundling may reduce load/power consumption. The UE may communicate its preference to the network to have this feature enabled. Thus, the UEAI may also include the following fields.

Preferred UL types NR (set the UL type for UE for NR)—the UE transmit a bitmap indicating whether it prefers either UL only or SUL only or both. In case only one UL type is supported, the UE may turn off the other transmit chain, which may save power and reduce heating.

ACK bundling preferred NR (enable/disable ACK bundling for UE for NR)—the UE may indicate to the network whether it prefers to enable ACK bundling for PDSCH transmissions. Enabling ACK bundling may potentially reduce the on-time of one of the transmit chains.

Figure 6:
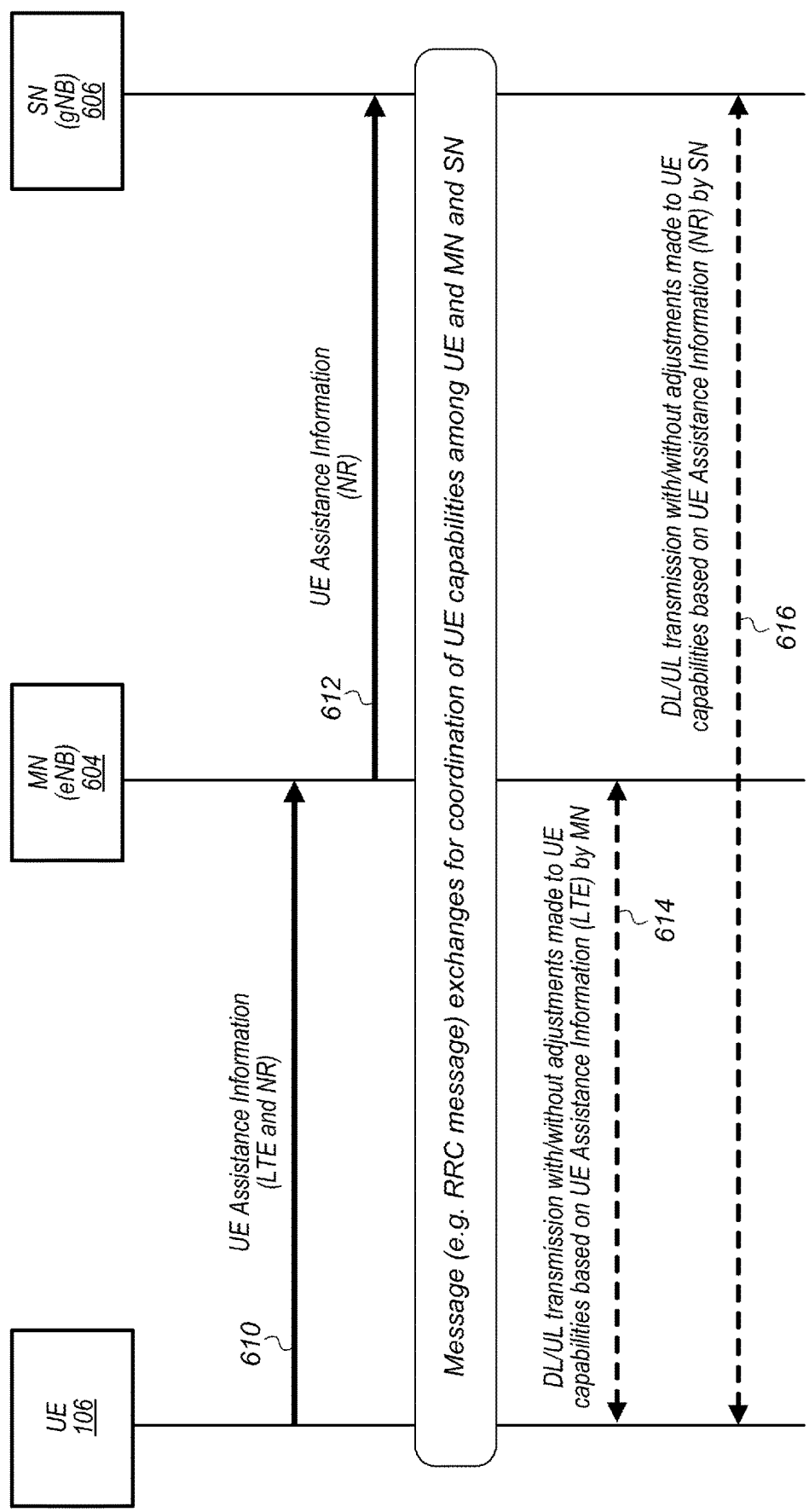
FIG. 6 shows an exemplary timing diagram illustrating transmission of LTE RRC messages that include UE Assistance Information for NR, according to some embodiments.

FIG. 6 shows an exemplary timing diagram illustrating the transmission of LTE RRC messages that include UE Assistance Information for NR, according to some embodiments. The information pertaining to any feature (or operating parameter) may be transmitted from a UE to network (eNB and gNB) when both networks and the UE support the feature, and the UE is permitted by the network to transmit the information/request. Depending on the reason identified by the UE for transmitting the UEAI and/or request for feature/operating parameter adjustment, the UEAI may include the information/request for LTE only or NR only, or for both LTE and NR. Once LTE eNB receives the UEAI for NR, the eNB may forward this information to the gNB. Upon receiving the respective UEAI/request, the eNB (for UEAI for LTE) and/or gNB (for UEAI for NR) may honor the requests or may reject the requests. The decision may be made independently by the eNB and the gNB. In some embodiments, a prohibit timer may be implemented in both the eNB and the gNB, and the prohibit time may be reset whenever UEAI is reported from the UE. While the timer is running, the UE may not transmit additional UEAI.

As illustrated in FIG. 6, UE 106 may transmit in a message 610, e.g. in an LTE RRC message, UEAI (or feature/operating parameter adjustment request) for LTE and NR to eNB 604. The UEAI for NR included in message 610 may be transmitted by eNB 604 to gNB 606 in a second message 612. Subsequently, DL/UL transmissions 614 may take place between UE 106 and eNB 604 with or without adjustments to UE capabilities by eNB 604, based on the UE Assistance Information (for LTE). Similarly, DL/UL transmissions 616 may take place between UE 106 and gNB 606 with or without adjustments to UE capabilities by gNB 606, based on the UE Assistance Information (for NR). The UE 106 may be prompted to transmit the UEAI by issues relating to in-device coexistence, overheating, issues relating to HW-sharing (shared resources), etc.

Option 2

Figure 7:
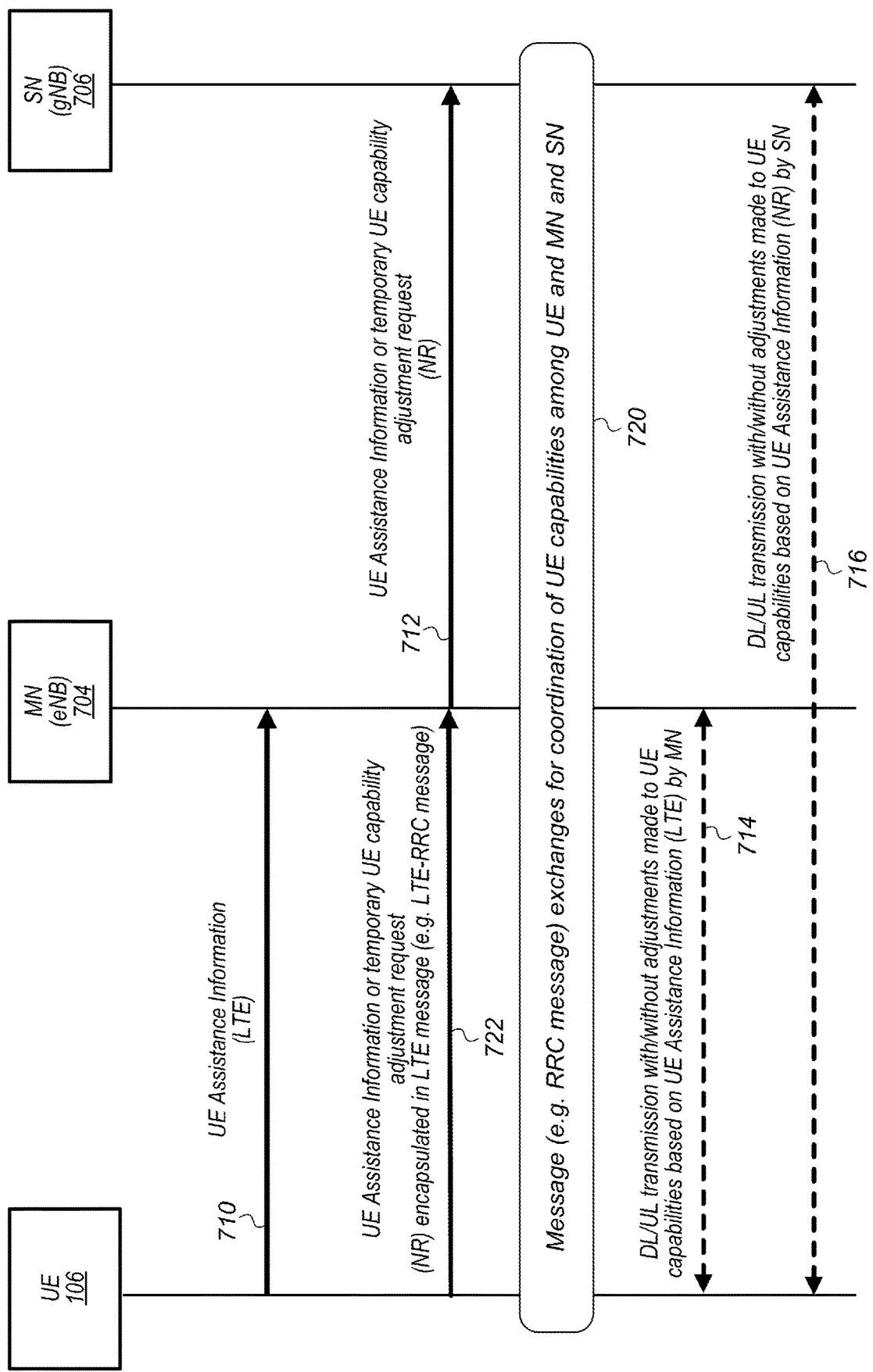
FIG. 7 shows an exemplary timing diagram illustrating transmission of LTE RRC messages that include encapsulated NR RRC messages that include UE Assistance Information for NR, according to some embodiments.

FIG. 7 shows an exemplary timing diagram illustrating transmission of LTE RRC messages that include encapsulated NR RRC messages which include UE Assistance Information for NR, according to some embodiments. As previously mentioned, a second approach may extend the temporary UE capability adjustment/restriction mechanism for SA mode of operation to NSA mode of operation by encapsulating NR RRC messages in LTE RRC messages. In this approach, the eNB may forward the NR temporary capability adjustment (e.g. restriction) request message (or NR RRC message) to the gNB through LTE-RRC signaling. In this case, the LTE and NR capabilities may be temporarily adjusted via their own respective mechanisms. For example, a separate NR temporary UE capability adjustment (e.g. restriction) request message or UEAI (similar to LTE UEAI) in a message may be transmitted with the newly introduced fields discussed in detail above with respect to Option 1. In other words, in this approach, separate NR messages (e.g. NR RRC messages) may be created, and those messages may include any one or more of the UEAI fields discussed with respect to Option 1. The NR messages may be encapsulated in LTE messages that are transmitted by the UE to the eNB, and the eNB may then forward those encapsulated NR messages to the gNB.

As illustrated in FIG. 7, UE 106 may transmit in a message 710, e.g. in an LTE RRC message, UEAI (or feature/operating parameter adjustment request) for LTE to eNB 704. The UE 106 may also transmit to eNB 704 in another message 722 (which may be an LTE RRC message), UEAI (or feature/operating parameter adjustment request) for NR included in an NR message encapsulated in message 722. The eNB 704 may then forward message 722 as message 712 to gNB 706. Subsequently, DL/UL transmissions 714 may take place between UE 106 and eNB 704 with or without adjustments to UE capabilities by eNB 704, based on the UE Assistance Information (for LTE). Similarly, DL/UL transmissions 716 may take place between UE 106 and gNB 706 with or without adjustments to UE capabilities by gNB 706, based on the UE Assistance Information (for NR). The UE 106 may be prompted to transmit the UEAI by issues relating to in-device coexistence, overheating, issues relating to HW-sharing (shared resources), etc.

Option 3

Figure 8:
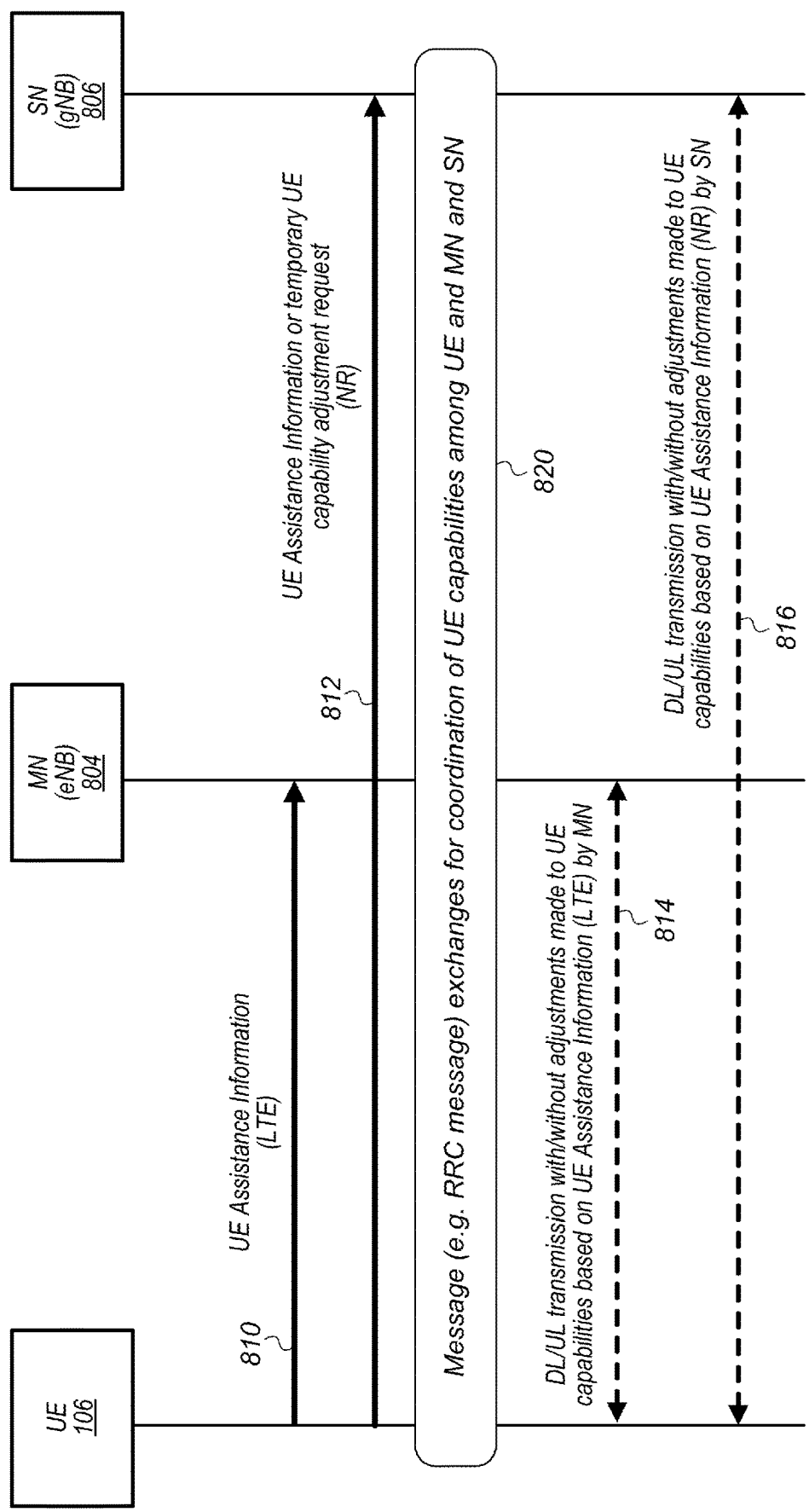
FIG. 8 shows an exemplary timing diagram illustrating transmission of LTE RRC messages that include UE Assistance Information and transmission of separate NR RRC messages that include UE Assistance Information, according to some embodiments.

FIG. 8 shows an exemplary timing diagram illustrating transmission of LTE RRC messages that include UE Assistance Information and transmission of separate NR RRC messages that include UE Assistance Information, according to some embodiments. As previously noted, a third approach may include transmitting separate requests and/or UEAI for LTE and NR to respective corresponding base stations. This approach may be used when there is no interaction needed between the different base stations operating according to different RATs, e.g. between eNB and gNB. E.g., even if the UE is operating in NSA mode, if the UE requests an adjustment to a specific feature, e.g. the UE requests to restrict the number of CCs, in NR Scells for any reason, e.g. due to overheating, it is possible for the gNB to reconfigure the UE independently with the configuration impacting the NR communications only, while the number of CCs for LTE communications remain the same. The same possibility is available to LTE, where adjustments are made for LTE communications only while no adjustments are made for NR communications. Of course, adjustments may be made for both RATs, depending on the respective messages transmitted by the UE to the base stations. The UE may send the LTE side request via LTE messaging (e.g. LTE RRC messages), and send the NR side requests via NR messaging (e.g. NR RRC messages). The UE may determine whether to make adjustments to (e.g. restrict) the capabilities for either LTE communications or NR communications or both. This way, the LTE and NR capabilities may be temporarily adjusted via their own respective mechanisms. In this approach, separate NR messages (e.g. NR RRC messages) may be created and transmitted by the UE directly to the gNB, and the messages may include any one or more of the UEAI fields discussed with respect to Option 1.

As illustrated in FIG. 8, UE 106 may transmit in a message 810, e.g. in an LTE RRC message, UEAI (or feature/operating parameter adjustment request) for LTE to eNB 804. The UE 106 may also transmit to gNB 806 in another message 812 (which may be an NR RRC message), UEAI (or feature/operating parameter adjustment request) for NR. Subsequently, DL/UL transmissions 814 may take place between UE 106 and eNB 704 with or without adjustments to UE capabilities by eNB 804, based on the UE Assistance Information (for LTE). Similarly, DL/UL transmissions 816 may take place between UE 106 and gNB 806 with or without adjustments to UE capabilities by gNB 806, based on the UE Assistance Information (for NR). The UE 106 may be prompted to transmit the UEAI by issues relating to in-device coexistence, overheating, issues relating to HW-sharing (shared resources), etc. It should be noted that since UE 106 is transmitting directly to gNB, as illustrated in FIG. 8, the temporary capability adjustment is fully supported during SA mode of operation.

Update of Temporarily Capability

Once a UE has transmitted UEAI and/or a temporary capability adjustment (e.g. restriction) request to eNB and/or gNB, the UE may explicitly inform the (respective) network by sending another message after determining that the issue(s) (which prompted the transmission of UEAI and/or a temporary capability adjustment request) has been resolved. The UE may do this by transmitting new UEAI which may actually target restoring the previous settings, and or simply target a new set of preferred capabilities. The UE may similarly transmit a temporary UE capability adjustment request with new set of preferred capability values. The new set of preferred capability values may include either standard capabilities or another set of relaxed reduced capabilities. In some embodiments, the network may operate an internal timer during which the network honors the adjusted (e.g. reduced) UE capability. The timer value may be set to a value long enough for any issues that prompted the original UEAI/request to be resolved. Once the timer has expired the, network may revert the UE capability back to the original or standard capability values of the UE.

Temporarily Capability Adjustment (e.g. Restriction) for SA Mode of Operation

Any newly introduced temporary UE capabilities for NR—e.g. those described above with respect to Option 1—also may be used for the temporary UE capability adjustment (e.g. capability restriction) for an SA mode of operation. In this case, UE may directly transmit a temporary capability adjustment (e.g. temporary capability restriction) request to the gNB.

Connected Mode Versus Idle Mode

The UE capability may be temporarily adjusted while the UE is in Connected-mode via RRC signaling, as described in detail above. If the UE moves to IDLE state while its capability is adjusted (e.g. its capability is restricted), then the network may interpret the state of the UE and its capabilities in at least two different ways. In some embodiments, any temporarily adjusted capabilities may be released once the UE moves to an IDLE state. Alternately, when the UE moves to IDLE state, the network may simply retain the reduced capability values.

If the UE makes and RRC reestablishment with network, the network may again interpret the state of the UE and its capabilities in at least two different ways. In some embodiments, the network and the UE may revert to the default (or standard/normal) UE capabilities. Alternately, the network and the may retain/continue to use the previously adjusted capability values.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. An apparatus comprising:
a processor configured to cause a wireless communication device (UE) to:
wirelessly communicate with a first base station according to a first radio access technology (RAT), wherein the first base station is a new radio (NR) base station (gNB) and the first RAT is NR;
transmit assistance information to the first base station, wherein the assistance information comprises first preferred values of first operating parameters of the UE corresponding to timing information for communicating according to the first RAT, wherein the first operating parameters include:
K0, associated with a time difference between transmissions of a physical downlink control channel (PDCCH) and a physical downlink shared channel (PDSCH), and
K2, associated with a time difference between transmissions of the PDCCH and a physical uplink shared channel (PUSCH); and
conduct transmissions with the first base station according to:
adjusted first operating parameters in response to the first base station adjusting the first operating parameters according to the first preferred values; or
unadjusted first operating parameters in response to the first base station not adjusting the first operating parameters.

2. The apparatus of claim 1, wherein the processor is configured to further cause the UE to transmit the assistance information in a first-RAT radio resource control message.

3. The apparatus of claim 1, wherein the processor is configured to further cause the UE to transmit the assistance information in response to an operating issue of the UE.

4. The apparatus of claim 3, wherein the operating issue comprises one or more of the following:
the UE overheating;
the UE consuming more than a specified amount of power;
in-device coexistence performance within the UE; or
hardware sharing within the UE.

5. The apparatus of claim 1, wherein the processor is configured to further cause the UE to:
include second preferred values in a second-RAT radio resource control message encapsulated in a first-RAT radio resource control message that is included in the transmit assistance information;
wherein the first-RAT radio resource control message is to be forwarded by the first base station to a second base station, and wherein the second preferred values correspond to one or more second operating capabilities of the UE associated with communicating with the second base station according to the second RAT.

6. The apparatus of claim 1, wherein the processor is configured to further cause the UE to transmit a message to the first base station, wherein the message indicates that the first operating parameters no longer need to be adjusted.

7. The apparatus of claim 1, wherein the processor is configured to further cause the UE to conduct transmissions with the first base station according to the unadjusted first operating parameters upon expiration of a first timer in the first base station, if the first base station adjusted the first operating parameters.

8. A wireless communication device (UE) comprising:
radio circuitry configured to wirelessly communicate with a first base station according to a first radio access technology (RAT), wherein the first base station is a new radio (NR) base station (gNB) and the first RAT is NR;
a processor configured to:
transmit, via the radio circuitry, assistance information to the first base station, wherein the assistance information comprises first preferred values of first operating parameters of the UE corresponding to timing information for communicating according to the first RAT, wherein the first operating parameters include:
K0, associated with a time difference between transmissions of a physical downlink control channel (PDCCH) and a physical downlink shared channel (PDSCH), and
K2, associated with a time difference between transmissions of the PDCCH and a physical uplink shared channel (PUSCH); and
conduct transmissions, via the radio circuitry, with the first base station according to:
adjusted first operating parameters in response to the first base station adjusting the first operating parameters according to the first preferred values; or
unadjusted first operating parameters in response to the first base station not adjusting the first operating parameters.

9. The UE of claim 8, wherein the processor is further configured to transmit the assistance information in a first-RAT radio resource control message.

10. The UE of claim 8, wherein the processor is configured to transmit the assistance information in response to an operating issue of the UE.

11. The UE of claim 10, wherein the operating issue comprises one or more of the following:
the UE overheating;
the UE consuming more than a specified amount of power;
in-device coexistence performance within the UE; or
hardware sharing within the UE.

12. The UE of claim 8, wherein the processor is configured to:
include second preferred values in a second-RAT radio resource control message encapsulated in a first-RAT radio resource control message that is included in the transmit assistance information;
wherein the first-RAT radio resource control message is to be forwarded by the first base station to a second base station, and wherein the second preferred values correspond to one or more second operating capabilities of the UE associated with communicating with the second base station according to the second RAT.

13. The UE of claim 8, wherein the processor is configured to transmit a message to the first base station, wherein the message indicates that the first operating parameters no longer need to be adjusted.

14. The UE of claim 8, wherein the processor is configured to:
conduct transmissions with the first base station according to the unadjusted first operating parameters upon expiration of a first timer in the first base station, if the first base station adjusted the first operating parameters.

15. A new radio (NR) base station (gNB) comprising:
radio circuitry configured to wirelessly communicate with a wireless communication device (UE) according to a first radio access technology (RAT), wherein the first RAT is NR; and
a processor configured to:
  receive, via the radio circuitry, assistance information from the UE, wherein the assistance information comprises first preferred values of first operating parameters of the UE corresponding to timing information for communicating according to the first RAT, wherein the first operating parameters include:
    K0, associated with a time difference between transmissions of a physical downlink control channel (PDCCH) and a physical downlink shared channel (PDSCH), and
    K2, associated with a time difference between transmissions of the PDCCH and a physical uplink shared channel (PUSCH); and
  conduct transmissions, via the radio circuitry, with the UE according to:
    adjusted first operating parameters in response to the processor adjusting the first operating parameters according to the first preferred values; or
    unadjusted first operating parameters in response to the processor not adjusting the first operating parameters.

16. The base station of claim 15, wherein the processor is further configured to:
  receive the first assistance information in a first-RAT radio resource control message.

17. The base station of claim 15, wherein the processor is further configured to receive the first assistance information in response to an operating issue of the UE.

18. The base station of claim 17, wherein the operating issue comprises one or more of the following:
  the UE overheating;
  the UE consuming more than a specified amount of power;
  in-device coexistence performance within the UE; or
  hardware sharing within the UE.

19. The base station of claim 15, wherein the processor is further to:
  receive a first message from the UE, wherein the first message indicates that first operating parameters no longer need to be adjusted.

20. The base station of claim 15, wherein the processor is further configured to:
  conduct transmissions with the UE according to the unadjusted first operating parameters upon expiration of a first timer, if the processor adjusted the first operating parameters.

* * * * *